United States Patent
Tsai et al.

(10) Patent No.: US 11,644,554 B2
(45) Date of Patent: May 9, 2023

(54) TIME OF FLIGHT SENSOR CAPABLE OF COMPENSATING TEMPERATURE DEVIATION AND TEMPERATURE COMPENSATION METHOD THEREOF

(71) Applicant: PixArt Imaging Inc., Hsin-Chu County (TW)

(72) Inventors: Tso-Sheng Tsai, Hsin-Chu County (TW); Yueh-Lin Chung, Hsin-Chu County (TW); Shin-Lin Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 473 days.

(21) Appl. No.: 16/936,777

(22) Filed: Jul. 23, 2020

(65) Prior Publication Data

US 2022/0026545 A1 Jan. 27, 2022

(51) Int. Cl.
| | | |
|---|---|---|
| G01S 7/48 | (2006.01) | |
| G01S 7/497 | (2006.01) | |
| G01S 17/10 | (2020.01) | |
| G01S 7/481 | (2006.01) | |
| G01S 7/4865 | (2020.01) | |

(52) U.S. Cl.
CPC ............ G01S 7/497 (2013.01); G01S 7/4814 (2013.01); G01S 7/4816 (2013.01); G01S 7/4865 (2013.01); G01S 17/10 (2013.01)

(58) Field of Classification Search
USPC ........................................................ 356/5.01
See application file for complete search history.

(56) References Cited

U.S. PATENT DOCUMENTS

| | | | | |
|---|---|---|---|---|
| 2008/0247033 | A1* | 10/2008 | Buettgen | H03D 7/00 359/325 |
| 2019/0346540 | A1* | 11/2019 | Boutaud | G01S 17/18 |
| 2019/0346541 | A1* | 11/2019 | Boutaud | G01S 17/89 |

FOREIGN PATENT DOCUMENTS

| | | | | |
|---|---|---|---|---|
| CN | 109801321 A | * | 5/2019 | |
| CN | 112565732 A | * | 3/2021 | ............ G01S 17/894 |
| CN | 112640447 A | * | 4/2021 | ............ G01S 17/87 |
| WO | WO-2021246303 A1 | * | 12/2021 | |

* cited by examiner

*Primary Examiner* — James R Hulka
(74) *Attorney, Agent, or Firm* — Hauptman Ham, LLP (57) ABSTRACT

There is provided a time of flight sensor including a light source, a first pixel, a second pixel and a processor. The first pixel generates a first output signal without receiving reflected light from an external object illuminated by the light source. The second pixel generates a second output signal by receiving the reflected light from the external object illuminated by the light source. The processor calculates deviation compensation and deviation correction associated with temperature variation according to the first output signal to accordingly calibrate a distance calculated according to the second output signal.

20 Claims, 8 Drawing Sheets

TIME OF FLIGHT SENSOR CAPABLE OF COMPENSATING TEMPERATURE DEVIATION AND TEMPERATURE COMPENSATION METHOD THEREOF

BACKGROUND

1. Field of the Disclosure

This disclosure generally relates to a time of flight sensor and, more particularly, to a time of flight sensor that prestores deviation compensation and deviation correction associated with temperature variation for calibrating the detection deviation caused by different operating temperatures and a temperature compensation method thereof.

2. Description of the Related Art

Figure 1:
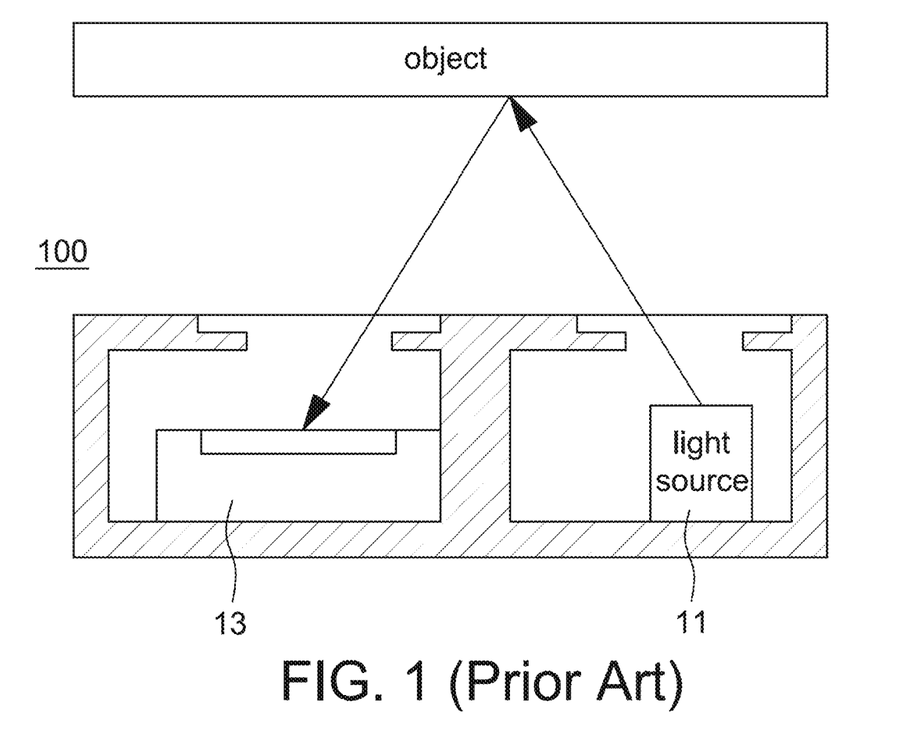
FIG. 1 is a schematic diagram of a conventional time of flight sensor.

Referring to FIG. 1, it is a schematic diagram of a conventional time of flight sensor 100 which includes a light source 11 and a light sensor 13 respectively disposed in two accommodation spaces of an encapsulation. The light source 11 projects emission light toward an object outside the encapsulation, and the emission light is reflected by the object to generate reflected light that enters the encapsulation to be received by the light sensor 13.

Figure 2:
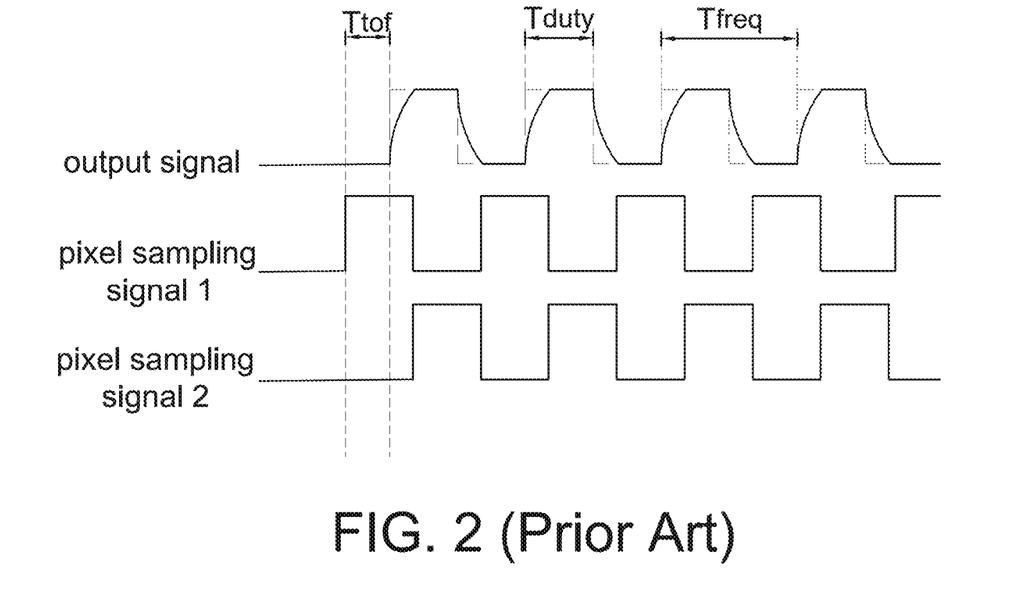
FIG. 2 is a timing diagram of an output signal and pixel sampling signals of the time of flight sensor in FIG. 1.

Referring to FIG. 2, it is a timing diagram of an output signal and pixel sampling signals of the time of flight sensor 100. A time interval from the light source 11 emits light till the light sensor 13 receives the reflected light from the object is called a time of light (TOF) $T_{tof}$. By multiplying this time of flight $T_{tof}$ by a half of velocity of light, it is able to obtain a distance between the object and the time of flight sensor 100.

However, the light source 11 generally has the temperature dependency. Under different operating temperatures, different modulation parameters are generated caused by such as the variation of clock duty $T_{duty}$ and the drift of frequency $T_{freq}$, as shown FIG. 2, to cause the deviation in the measured distance.

It is possible to compensate this deviation by using the light source having lower temperature dependency or embedding a temperature sensor to measure the operating temperature, but these methods do not have effective compensation on a time of flight sensor adopting modulated light source.

Accordingly, it is necessary to provide a time of flight sensor that can effectively compensate the temperature dependency of the light source thereof.

SUMMARY

The present disclosure provides a time of flight sensor and a temperature compensation method thereof that use a reference pixel to compensate the temperature dependency of the detection result of an active pixel.

The present disclosure provides a time of flight sensor including a light source, a light sensor and a processor. The light source is configured to illuminate light according to a light source driving signal. The light sensor includes a first pixel and a second pixel. The first pixel is configured to receive a sampling signal, generate, at a reference temperature, a first reference output signal when the sampling signal and the light source driving signal have a first time delay therebetween, and generate a second reference output signal when the sampling signal and the light source driving signal have a second time delay therebetween, and generate, at an operating temperature, a first operation output signal when the sampling signal and the light source driving signal have the first time delay therebetween, and generate a second operation output signal when the sampling signal and the light source driving signal have the second time delay therebetween. The second pixel is configured to receive the sampling signal, and generate an operation detected signal at the operating temperature when the sampling signal and the light source driving signal have the first time delay therebetween. The processor is configured to obtain a first reference phase-distance relationship according to the first reference output signal and the second reference output signal, and obtain an operation phase-distance relationship according to the first operation output signal and the second operation output signal, calculate a temperature compensation and a temperature correction according to the first reference phase-distance relationship and the operation phase-distance relationship, and calibrate a current phase obtained according to the operation detected signal using the temperature compensation and the temperature correction.

The present disclosure further provides a time of flight sensor including a light source, a light sensor, a memory and a processor. The light source is configured to illuminate light according to a light source driving signal. The light sensor includes a first pixel and a second pixel configured to generate output signals according to a sampling signal. The memory is configured to previously record a first reference phase-distance relationship associated with the first pixel at a reference temperature, as well as a detection compensation and a detection correction that are obtained according to a second reference phase-distance relationship associated with the second pixel at the reference temperature. The processor is configured to, at an operating temperature, calculate an operation phase-distance relationship associated with the first pixel, calculate a temperature compensation and a temperature correction according to the first reference phase-distance relationship and the operation phase-distance relationship, and calibrate a current distance using the temperature compensation, the temperature correction, the detection compensation and the detection correction.

The present disclosure further provides a temperature compensation method of a time of flight sensor. The time of flight sensor includes a time controller, a first delay circuit, a second delay circuit, a first pixel, a second pixel and a light source. The first delay circuit is coupled to the light source, and the second delay circuit is coupled to the first pixel and the second pixel. The temperature compensation method includes the steps of: generating, by the time controller, a timing signal to the first delay circuit and the second delay circuit, and setting the first delay circuit and the second delay circuit to sequentially have a first time delay and a second time delay; generating a first reference output signal by the first pixel under a reference temperature and the first time delay; generating a second reference output signal by the first pixel under the reference temperature and the second time delay; obtaining and recording a first reference phase-distance relationship according to the first reference output signal and the second reference output signal; generating a first operation output signal by the first pixel under an operating temperature and the first time delay; generating a second operation output signal by the first pixel under the operating temperature and the second time delay; obtaining an operation phase-distance relationship according to the first operation output signal and the second operation output signal; calculating a temperature compensation and a temperature correction according to the first reference phase-distance relationship and the operation phase-distance relationship; and calibrating a current phase obtained according to an operation detected signal generated by the second pixel under the operating temperature using the temperature compensation and the temperature correction.

The present disclosure further provide a time of flight sensor including an encapsulation, a light source, a first pixel and a second pixel. The encapsulation jas a first accommodation space and a second accommodation space, wherein the first accommodation space is connected to a first opening and covered by a top cover surrounding the first opening, and the second accommodation space is connected to a second opening. The light source is arranged in the first accommodation space. The first pixel is arranged in the first accommodation space, and configured to receive reflected light projected by the light source to the top cover. The second pixel is arranged in the second accommodation space, and configured to receive reflected light formed by emission light projected by the light source to penetrate the first opening of the first accommodation space, reflected by an external object, and then penetrating the second opening of the second accommodation space.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The time of flight (TOF) sensor of the present disclosure is to adopt an additional reference pixel that is used to previously record a temperature compensation and a temperature correction in the memory. The temperature compensation and the temperature correction are used to calibrate a phase and a distance obtained in actual operation. There are two stages before the actual operation. The first stage is a setting stage before shipment in which a reference phase-distance relationship associated with the reference pixel is recorded under a reference temperature. The second stage is a booting stage before each actual operation in which an operation phase-distance relationship associated with the reference pixel is recorded under an operating temperature. The temperature compensation and the temperature correction are calculated according to the reference phase-distance relationship and the operation phase-distance relationship for calibrating a temperature variation between the reference temperature and the operating temperature. In this way, the deviation caused by the temperature variation is effectively eliminated.

Figure 3:
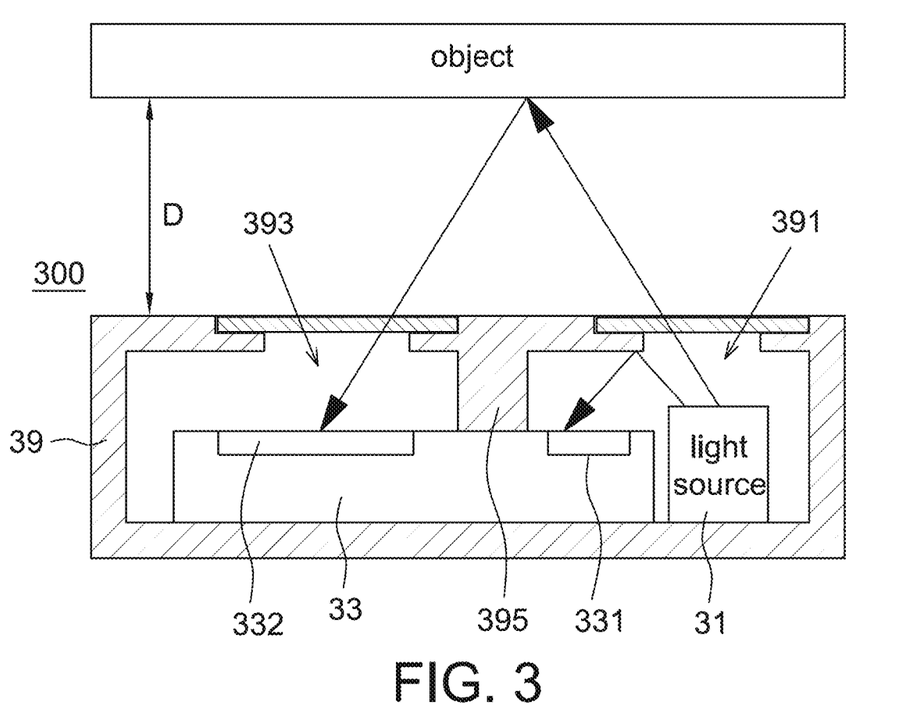
FIG. 3 is a schematic diagram of a time of flight (TOF) sensor according to one embodiment of the present disclosure.

Referring to FIG. 3, it is a schematic diagram of a time of flight (TOF) sensor 300 according to one embodiment of the present disclosure. The TOF sensor 300 is used to detect a distance D of an object according to a time of flight of light. The TOF sensor 300 includes a light source 31 and a light sensor 33 arranged in an encapsulation 39. It should be mentioned that although FIG. 3 shows that the light source 31 and the light sensor 33 are disposed in a same encapsulation 39, the present disclosure is not limited thereto. In other aspects, the light source 31 and the light sensor 33 are respectively arranged in different encapsulations. Details of the present disclosure are illustrated hereinafter based on FIG. 3 as an example.

The light source 31 emits light of an identifiable spectrum to illuminate an object outside the encapsulation 39. The light source 31 is a coherent light source or a non-coherent light source, e.g., a light emitting diode or a laser diode.

The light sensor 33 includes, e.g., a CMOS sensor which has a first pixel 331 and a second pixel 332, wherein the first pixel 331 and the second pixel 332 respectively include at least one photodiode or at least one single photon avalanche diode (SPAD) used to detect optical energy and output electrical signals. It should be mentioned that although FIG. 3 shows that the first pixel 331 and the second pixel 332 are arranged in the same base layer, the present disclosure is not limited thereto. In other aspects, the first pixel 331 and the second pixel 332 are respectively arranged in different base layers.

The encapsulation 39 has a first accommodation space 391 and a second accommodation space 393. The first accommodation space 391 is connected to a first opening and covered by a top cover surrounding the first opening, and is used to accommodate the first pixel 331 and the light source 31, wherein the first pixel 331 receives reflected light from the top cover (e.g., located upon the first pixel 331) of the encapsulation 39 illuminated by the light source 31. As the first pixel 331 and the light source 31 are both disposed in the first accommodation space 391 and close to each other, a time of flight of emission light from being emitted from the light source 331 till propagating to the first pixel 331 is considered substantially identical to zero. The second accommodation space 393 is connected to a second opening, and is used to accommodate the second pixel 332.

More specifically, a part of emission light from the light source 31 is reflected inside the first accommodation space 391 to be received by the first pixel 331, and another part of emission light is reflected, after penetrating the first opening of the first accommodation space 391, by an external object outside the encapsulation 39 and then received by the second pixel 332 after entering the second opening of the second accommodation space 393.

The encapsulation 39 preferably has an isolation wall 395, e.g., extending downward from the top cover to a surface of the base layer as shown in FIG. 3, used to separate the first accommodation space 391 and the second accommodation space 393 to cause the second pixel 332 not to directly receive emission light from the light source 31 thereby reducing the interference.

In some aspects, the first opening of the first accommodation space 391 is further arranged with a filter to block light outside the emission spectrum of the light source 31 to reduce the interference from ambient light to the light detection of the first pixel 331; and the second opening of the second accommodation space 393 is further arranged with a filter to block light outside the emission spectrum of the light source 31 to reduce the interference from ambient light to the light detection of the second pixel 332.

Figure 4:
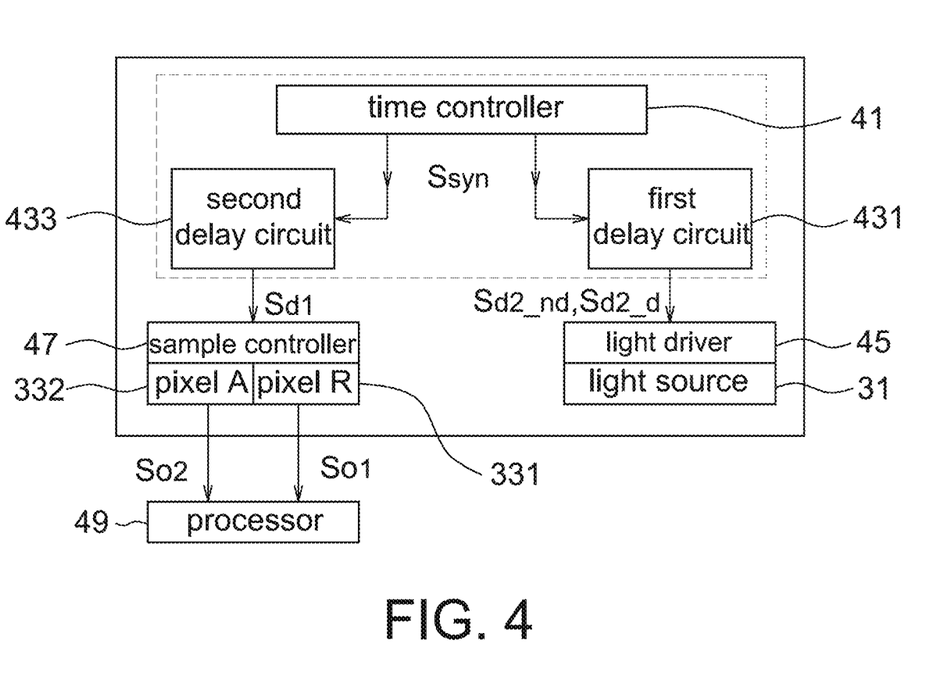
FIG. 4 is a schematic block diagram of a TOF sensor according to one embodiment of the present disclosure.

Please referring to FIG. 4, it is a schematic block diagram of the TOF sensor 300 according to one embodiment of the present disclosure, wherein elements identical to FIG. 3 are indicated by the same reference numerals. In the present disclosure, the TOF sensor 300 further includes a time control circuit (e.g., shown by a dotted block) used to generate a light source driving signal to the light source 31, and the light source driving signal is selected to be delayed (e.g., shown as $S_{d2\_d}$) or not to be delayed (e.g., shown as $S_{d2\_nd}$). The light source driver 45 drives the light source 31 to emit modulated light according to the light source driving signals $S_{d2\_d}$ and $S_{d2\_nd}$, e.g., modulating emission light of the light source 31 by alternating the driving voltage or driving current.

The time control circuit further generates a sampling signal $S_{d1}$ to the light sensor 33. The sampling controller 47 of the light sensor 33 reads charges (e.g., by a correlated double sampling, but not limited thereto) in the first pixel 331 and the second pixel 332 according to the sampling signal $S_{d1}$ to generate output signals $S_{O1}$ and $S_{O2}$, respectively. The time control circuit further controls a time delay between the sampling signal $S_{d1}$ and the light source driving signal $S_{d2\_d}$ and $S_{d2\_nd}$. That is, the delay in the present disclosure is referred to whether the light source driving signal has a time delay with respect to the sampling signal. The processor 49 calculates the compensation, the correction, the phase and the distance according to the output signals $S_{O1}$ and $S_{O2}$. An example will be illustrated hereinafter.

In the present disclosure, the processor 49 is selected from an application specific integrated circuit (ASIC) and a digital signal processor (DSP) that is arranged, for example, in the light sensor 33 to perform the calculation using software, firmware and/or hardware.

In one aspect, the time control circuit includes, for example, a time controller 41, a first delay circuit 431 and a second delay circuit 433. The time controller 41 generates a timing signal to the first delay circuit 431 and the second delay circuit 433. For example referring to FIG. 5, the time controller 41 generates a timing signal $S_{syn}$. The first delay circuit 431 is coupled to the light source 31, and delays the timing signal $S_{syn}$ by a delay time $T_{d0}$ or $T_{delay}$ to form the light source driving signal, e.g., $S_{d2\_nd}$ or $S_{d2\_d}$. The second delay circuit 433 is coupled to the first pixel 331 and the second pixel 332, and delays the timing signal $S_{syn}$ by a delay time $T_{d1}$ to form the sampling signal $S_{d1}$.

In one aspect, the sampling controller 47 or other circuit of the light sensor 33 further generates an inverse sampling signal $S_{d1\_inv}$ (e.g., referring to FIG. 6A to FIG. 7B) according to the sampling signal $S_{d1}$. The sampling signal $S_{d1}$ and the inverse sampling signal $S_{d1\_inv}$ are used to read charges in the first pixel 331 and the second pixel 332, wherein the method of generating the inverse sampling signal $S_{d1\_inv}$ from sampling signal $S_{d1}$ to accordingly read pixel charges is known to the art and not a main objective of the present disclosure, and thus details thereof are not described herein.

It is appreciated that although the timing signal $S_{syn}$, the sampling signal $S_{d1}$ as well as the light source driving signal $S_{d2\_nd}$ and $S_{d2\_d}$ are illustrated by square waves in the drawings, the present disclosure is not limited thereto. In other aspects, the timing signal $S_{syn}$, the sampling signal $S_{d1}$ as well as the light source driving signal $S_{d2\_nd}$ and $S_{d2\_d}$ respectively have other different waveforms according to different applications.

In the present disclosure, the TOF sensor 300 preferably includes a memory (e.g., volatile memory and/or non-volatile memory) used to previously (e.g., a setting stage before shipment) record and store (1) a first reference phase-distance relationship associated with the first pixel 311 at a reference temperature; and (2) a detection compensation and a detection correction that are obtained according to a second reference phase-distance relationship associated with the second pixel 332 at the reference temperature. The memory further records and stores before actual operation (e.g., a booting stage) (3) a temperature compensation and a temperature correction calculated according to an operation phase-distance relationship (obtained at an operating temperature) associated with the first pixel 331 and the first reference phase-distance relationship. These recorded parameters (1)-(3) are used to compensate and calibrate a detected phase and a detected distance during actual operation. An example will be given below for illustration purposes.

Figure 5:
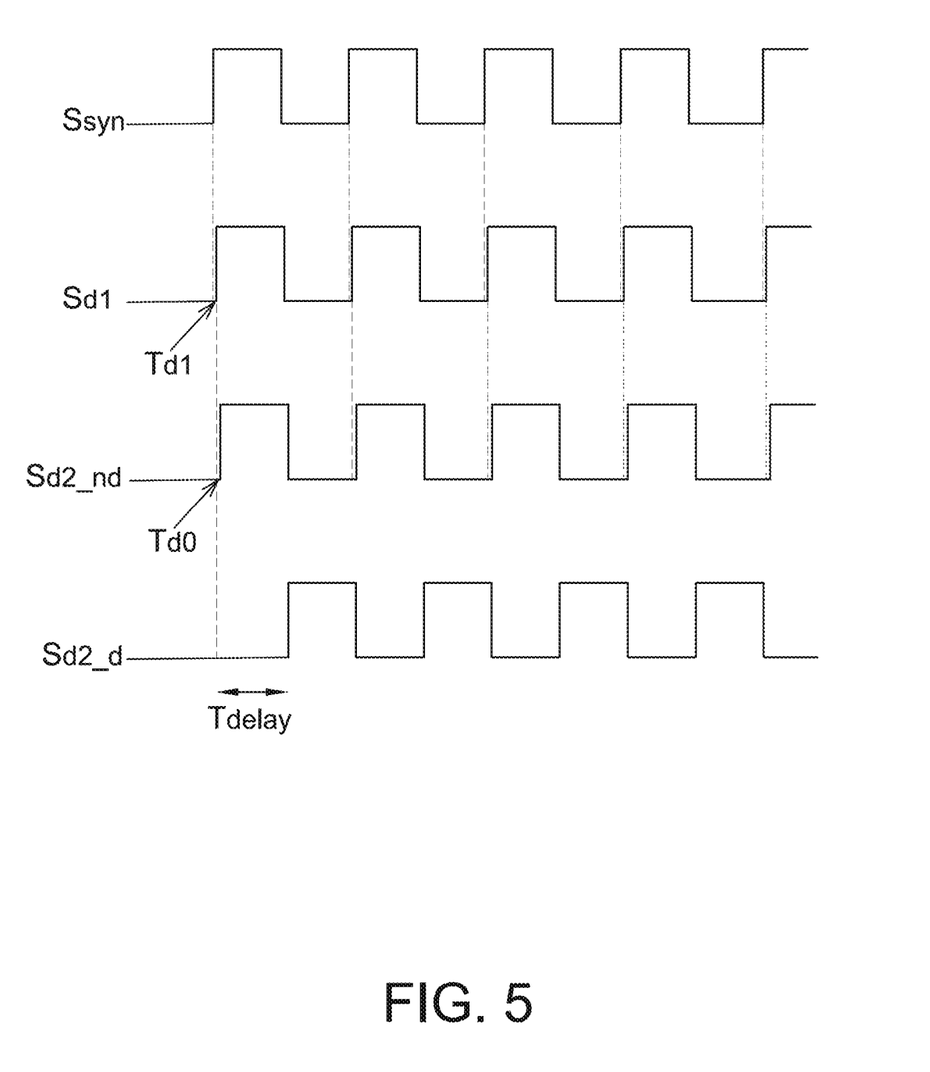
FIG. 5 is a timing diagram of control signals of the TOF sensor in FIG. 4.

Please referring to FIG. 3 to FIG. 8 together, the method of recording the temperature variation parameter in the setting stage before shipment is illustrated below. In the present disclosure, the environmental temperature in the setting stage is set as a reference temperature, e.g., 20 to 30 Celsius degrees, but not limited thereto. As shown in FIG. 5, the time control circuit sequentially controls the sampling signal $S_{d1}$ and the light source driving signal $S_{d2\_nd}$ and $S_{d2\_d}$ to have a first time delay $T_{d0}$ and a second time delay $T_{delay}$, wherein, for illustration purposes, in the present disclosure the first time delay $T_{d0}$ is set to be substantially identical to zero and the second time delay $T_{delay}$ is set to be larger than zero, but not limited thereto. In other aspects, the first time delay $T_{d0}$ is set to be larger than zero.

Figure 6A:
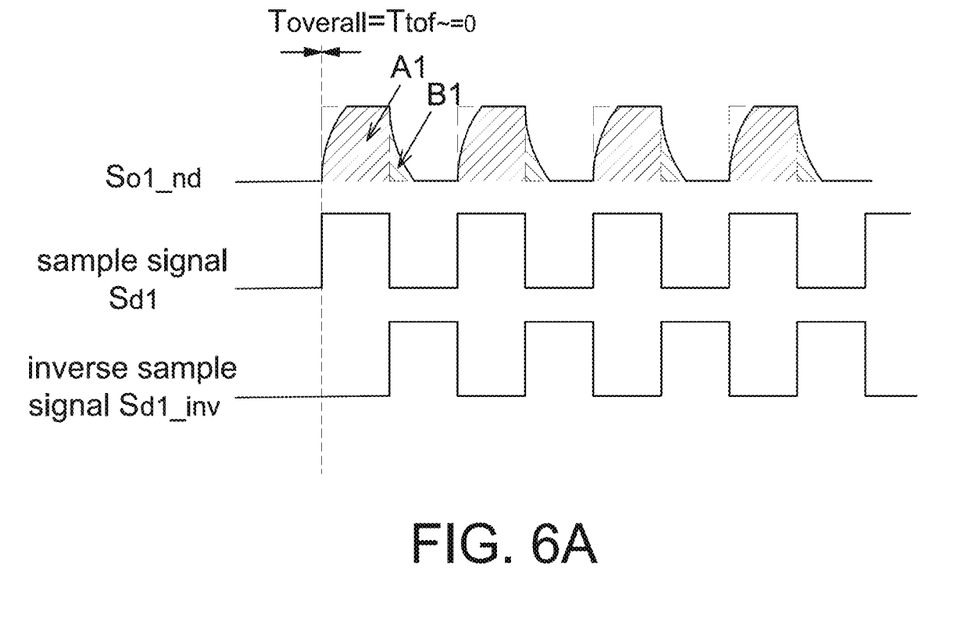
FIG. 6A is a timing diagram of an output signal and sampling signals of a first pixel of a TOF sensor in one embodiment of the present disclosure, wherein there is no time delay between a light source driving signal and sampling signals.
Figure 6B:
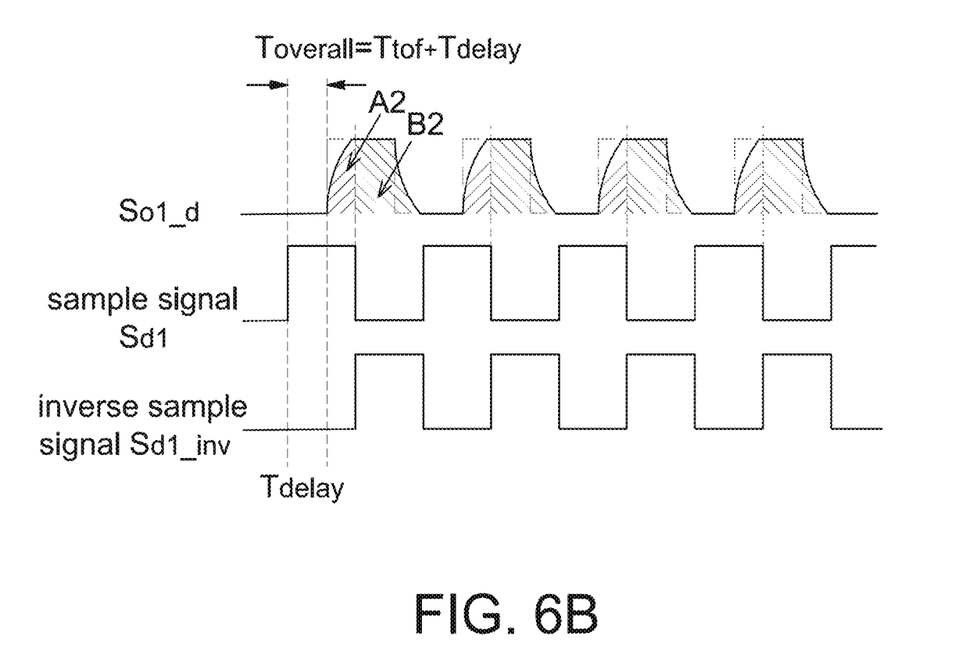
FIG. 6B is a timing diagram of an output signal and sampling signals of a first pixel of a TOF sensor in one embodiment of the present disclosure, wherein there is a time delay between a light source driving signal and sampling signals.

At the reference temperature, when the sampling signal $S_{d1}$ and the light source driving signal $S_{d2\_nd}$ and $S_{d2\_d}$ have the first time delay $T_{d0}$, the first pixel 331 generates a first reference output signal $S_{O1\_nd}$ as shown in FIG. 6A. As mentioned above, since a time of flight $T_{tof}$ associated with the first pixel 331 is substantially identical to zero and the first time delay $T_{d0}$ is substantially identical to zero, a time difference $T_{overall}$ between the first reference output signal $S_{O1\_nd}$ and the sampling signal $S_{d1}$ is substantially identical to zero, i.e. $T_{overall}=0$. When the sampling signal $S_{d1}$ and the light source driving signal $S_{d2\_nd}$ and $S_{d2\_d}$ have the second time delay $T_{delay}$, the first pixel 331 generates a second reference output signal $S_{O1\_d}$ as shown in FIG. 6B. Since a time of flight $T_{tof}$ is substantially identical to zero, $T_{overall}=T_{delay}$.

For example, when the first pixel 331 is a single pixel, the first reference output signal $S_{O1\_nd}$ and the second reference output signal $S_{O1\_d}$ are respectively an output signal of the single pixel; whereas, when the first pixel 331 includes multiple pixels, the first reference output signal $S_{O1\_nd}$ and the second reference output signal $S_{O1\_d}$ are respectively a summation or an average of output signals of the multiple pixels, wherein the summation and the average are implemented by the circuit of the first pixel 331.

Figure 8:
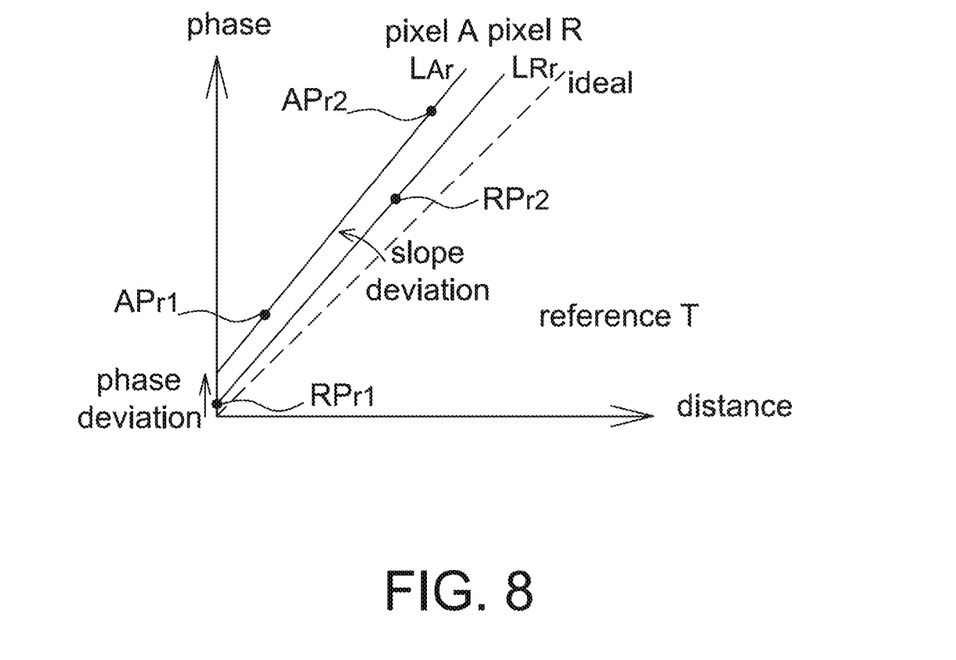
FIG. 8 is a relationship diagram between detected phases and detected distances associated with a first pixel and a second pixel when a TOF sensor of the present disclosure is at a reference temperature.

The processor 49 of the light sensor 33 or an external processor (e.g., an external computer may be used before shipment) obtains a first reference phase-distance relationship, e.g., a line $L_{Rr}$ shown in FIG. 8, according to the first reference output signal $S_{O1\_nd}$ and the second reference output signal $S_{O1\_d}$. As the detection is not under an ideal condition, the line $L_{Rr}$ has a deviation from an ideal line, e.g., shown as a phase deviation and a slope deviation.

In one aspect, the line $L_{Rr}$ is determined by using two reference points $RP_{r1}$ and $RP_{r2}$. For example, the processor 49 or the external processor obtains a first reference phase according to the first reference output signal $S_{O1\_nd}$, and obtains a first distance according to the first time delay $T_{d0}$ so as to obtain a first reference point $RP_{r1}$ at a phase-distance plane as shown in FIG. 8. For example, the processor 49 or the external processor calculates a ratio of area as the first reference phase according to an equation: area of B1/(area of A1+area of B1), and calculates the first distance according an equation: velocity of light×$T_{d0}$/2. Finally, a first reference point $RP_{r1}$ is obtained according to the calculated first reference phase (i.e. as a longitudinal axis value of the first reference point $RP_{r1}$) and the calculated first distance (i.e. as a transverse axis value of the first reference point $RP_{r1}$).

Similarly, the processor 49 or the external processor obtains a second reference phase (e.g., using an equation: area of B2/(area of A2+area of B2)) according to the second reference output signal $S_{O1\_d}$, and obtains a second distance (e.g., using an equation: velocity of light×$T_{delay}$/2) according to the second time delay $T_{delay}$ so as to obtain a second reference point $RP_{r2}$ at the phase-distance plane as shown in FIG. 8, wherein the method of obtaining the second reference point $RP_{r2}$ is identical to that of obtaining the first reference point $RP_{r1}$, and thus details thereof are not repeated herein.

Next, the processor 49 or the external processor obtains the first reference phase-distance relationship $L_{Rr}$ on the phase-distance plane according to a line connecting the first reference point $RP_{r1}$ and the second reference point $RP_{r2}$. The first reference phase-distance relationship $L_{Rr}$ is then recorded in the memory.

Figure 7A:
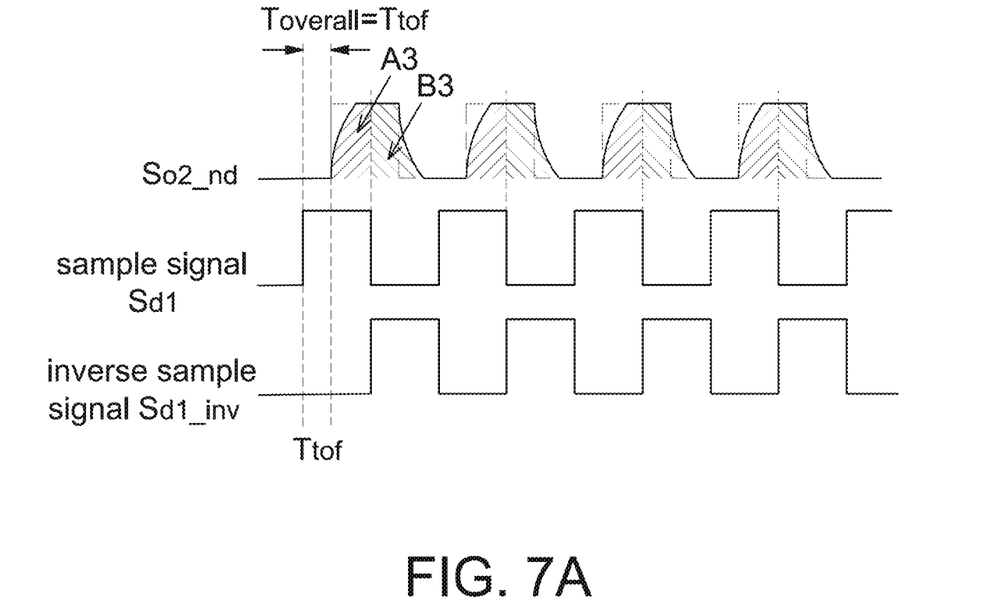
FIG. 7A is a timing diagram of an output signal and sampling signals of a second pixel of a TOF sensor in one embodiment of the present disclosure, wherein there is no time delay between a light source driving signal and sampling signals.
Figure 7B:
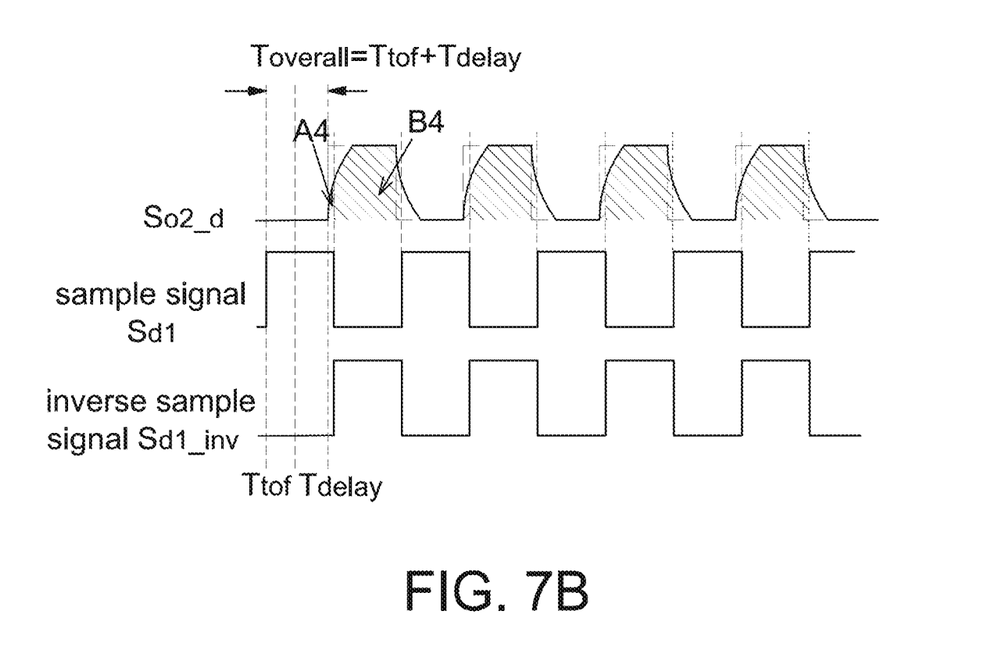
FIG. 7B is a timing diagram of an output signal and sampling signals of a second pixel of a TOF sensor in one embodiment of the present disclosure, wherein there is a time delay between a light source driving signal and sampling signals.

At the reference temperature, when the sampling signal $S_{d1}$ and the light source driving signal $S_{d2\_nd}$ and $S_{d2\_d}$ have the first time delay $T_{d0}$, the second pixel 332 generates a first detection output signal $S_{O2\_nd}$ as shown in FIG. 7A. In this stage, the object is arranged at a predetermined distance, and thus a predetermined time of flight $T_{tof}$ is already known. When the first time delay $T_{d0}$ is set to zero, a time difference $T_{overall}$ between the first detection output signal $S_{O2\_nd}$ and the sampling signal $S_{d1}$ is substantially identical to the predetermined time of flight $T_{tof}$. When the sampling signal $S_{d1}$ and the light source driving signal $S_{d2\_nd}$ and $S_{d2\_d}$ have the second time delay $T_{delay}$, the second pixel 332 generates a second detection output signal $S_{O2\_d}$ as shown in FIG. 7B, and $T_{overall}=T_{tof}+T_{delay}$.

Similarly, the second pixel 332 is a single pixel or includes multiple pixels, and used to directly output the first detection output signal $S_{O2\_nd}$ and the second detection output signal $S_{O2\_d}$, or output a summation or an average of output signals of the multiple pixels to form the first detection output signal $S_{O2\_nd}$ and the second detection output signal $S_{O2\_d}$.

Next, the processor 49 of the light sensor 33 or an external processor obtains a second reference phase-distance relationship according to the first detection output signal $S_{O2\_nd}$ and the second detection output signal $S_{O2\_d}$, e.g., a line $L_{Ar}$ shown in FIG. 8. As the detection is not under an ideal condition, the line $L_{Ar}$ has a deviation from the ideal line.

Similarly, the line $L_{Ar}$ is determined by using two detected points $AP_{r1}$ and $AP_{r2}$. For example, the processor 49 or the external processor obtains a first detected phase (e.g., a longitudinal axis value of first detected point $AP_{r1}$) according to the first detection output signal $S_{O2\_nd}$, and obtains a first detected distance (e.g., a transverse axis value of first detected point $AP_{r1}$) according to the first time delay $T_{d0}$ and the predetermined time of flight $T_{tof}$ (e.g., $T_{overall}=T_{d0}+T_{tof}$) so as to obtain a first detected point $AP_{r1}$ at a phase-distance plane as shown in FIG. 8. The first detected phase is calculated, for example, using an equation: area of B3/(area of A3+area of B3); and the first detected distance is calculated, for example, using an equation: velocity of light×$T_{overall}$/2, and these calculations have been described above, and thus are not repeated herein.

Similarly, the processor 49 or the external processor obtains a second detected phase (e.g., a longitudinal axis value of second detected point $AP_{r2}$) according to the second detection output signal $S_{O2\_d}$, and obtains a second detected distance (e.g., a transverse axis value of second detected point $AP_{r2}$) according to the second time delay $T_{delay}$ and the predetermined time of flight $T_{tof}$ (e.g., $T_{overall}=T_{delay}+T_{tof}$) so as to obtain a second detected point $AP_{r2}$ at the phase-distance plane as shown in FIG. 8. The second detected phase is calculated, for example, using an equation: area of B4/(area of A4+area of B4); and the second detected distance is calculated, for example, using an equation: velocity of light×$T_{overall}$/2, and these calculations have been described above, and thus are not repeated herein.

Next, the processor 49 or the external processor obtains a second reference phase-distance relationship $L_{Ar}$ according to a line connecting the first detected point $AP_{r1}$ and the second detected point $AP_{r2}$ on the phase-distance plane. In one aspect, the second reference phase-distance relationship $L_{Ar}$ is recorded in a memory. In another aspect, the processor 49 or the external processor obtains a detection compensation (e.g., a phase-axis intercept of $L_{Ar}$) and a detection correction (e.g., the correction to calibrate a slope of $L_{Ar}$ to a slope of ideal line, e.g., dotted line shown in FIG. 8) according to the second reference phase-distance relationship $L_{Ar}$, and the detection compensation as well as the detection correction are recorded in the memory without recording the second reference phase-distance relationship $L_{Ar}$.

After the above parameters are recorded or stored in the memory of the TOF sensor 300 before shipment, the setting stage is accomplished. It is appreciated that although the above descriptions are described in the way using two points to determine $L_{Rr}$ and $L_{Ar}$ as an example, the present disclosure is not limited thereto. In other aspects, by setting multiple time delays $T_{delay}$, it is possible to use multiple reference points to determine $L_{Rr}$ and use multiple detected points to determine $L_{Ar}$.

Please referring to FIGS. 3-6B and FIG. 9, the method of recording the temperature variation parameter in the booting stage before actual operation is illustrated hereinafter. In the present disclosure, the environmental temperature in the booting stage is set as an operating temperature, and an actual value thereof is determined according to an actual environmental temperature.

Similarly, the time control circuit controls the sampling signal $S_{d1}$ and the light source driving signal $S_{d2\_nd}$ and $S_{d2\_d}$ to sequentially have a first time delay $T_{d0}$ and the second time delay $T_{delay}$ according to FIG. 5 to correspond to the stored parameter obtained before shipment.

At the operating temperature, the first pixel 331 generates a first operation output signal, which is similar to $S_{O1\_nd}$ in FIG. 6A, when the sampling signal $S_{d1}$ and the light source driving signal $S_{d2\_nd}$ and $S_{d2\_d}$ have the first time delay $T_{d0}$, wherein when the operating temperature is different from the reference temperature, a calculated ratio of area right now is not equal to the ratio of area B1/(A1+B1) in FIG. 6A because a shape of the output signal is distorted. The first pixel 331 generates a second operation output signal, which is similar to $S_{O1\_d}$ in FIG. 6B, when the sampling signal $S_{d1}$ and the light source driving signal $S_{d2\_nd}$ and $S_{d2\_d}$ have the second time delay $T_{delay}$. Similarly, a calculated ratio of area is not equal to the ratio of area B2/(A2+B2) in FIG. 6B since a shape of the output signal is distorted due to the temperature variation. This waveform distortion causes the phase deviation Δoffset and the slope deviation Δslope as shown in FIG. 9.

Figure 9:
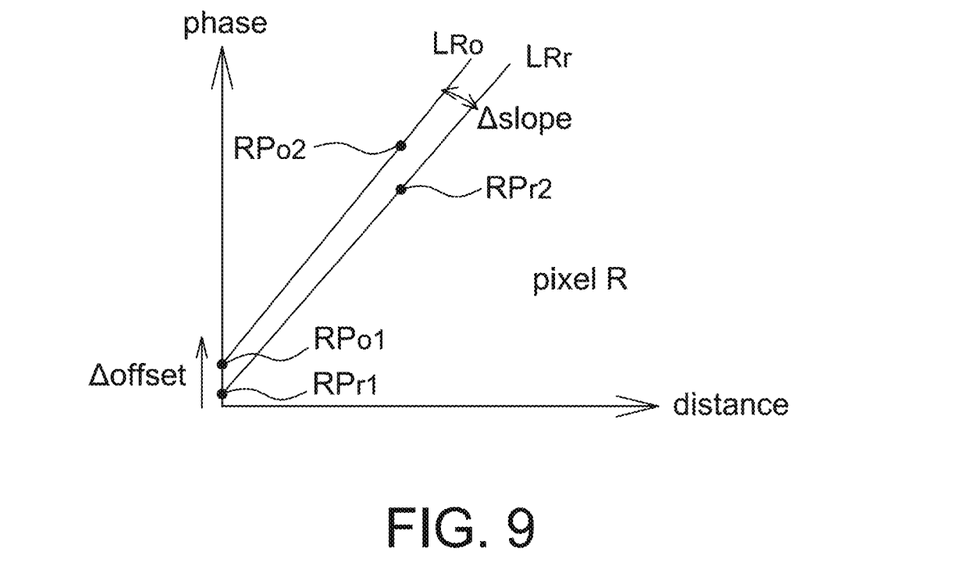
FIG. 9 is a relationship diagram between detected phases and detected distances associated with a first pixel when a TOF sensor of the present disclosure is at a reference temperature and an operating temperature.

The processor 49 of the light sensor 33 obtains an operation phase-distance relationship, e.g., a line $L_{Ro}$ in FIG. 9, according to the first operation output signal and the second operation output signal, which is similar to the method of obtaining the first reference phase-distance relationship $L_{Rr}$ according to the first reference output signal $S_{O1\_nd}$ and the second reference output signal $S_{O1\_d}$, and thus details thereof are nto repeated herein. The deviation between the first reference phase-distance relationship $L_{Rr}$ and the operation phase-distance relationship $L_{Ro}$ is considered to be caused by temperature change. Therefore, in the present disclosure the processor 49 calculates a temperature compensation Δoffset and a temperature correction Δslope according to the first reference phase-distance relationship $L_{Rr}$ and the operation phase-distance relationship $L_{Ro}$, wherein the temperature correction is, for example, a correction value Δslope=slope_$L_{Ro}$/slope_$L_{Rr}$ used to calibrate a slope of $L_{Ro}$ to match a slope of $L_{Rr}$. Then, the temperature compensation Δoffset and the temperature correction Δslope are temporarily (till the sensor being turned off or the next booting) stored in the memory for calibrating the current phase and the current distance calculated during actual operation.

Similarly, the line $L_{Ro}$ is determined by using two reference operation points $RP_{O1}$ and $RP_{O2}$. For example, the processor 49 obtains a first operation phase (e.g., a longitudinal axis value of first reference operation point $RP_{O1}$) according to the first operation output signal, and obtains a first distance (e.g., a transverse axis value of first reference operation point $RP_{O1}$) according to the first time delay $T_{d0}$ so as to obtain a first reference operation point $RP_{O1}$ at a phase-distance plane as shown in FIG. 9, wherein the first distance obtained according to the first reference operation point $RP_{O1}$ is substantially identical to the first distance obtained according to the first reference point $RP_{r1}$. The processor 49 further obtains a second operation phase (e.g., a longitudinal axis value of second reference operation point $RP_{O2}$) according to the second operation output signal, and obtains a second distance (e.g., a transverse axis value of second reference operation point $RP_{O2}$) according to the second time delay $T_{delay}$ so as to obtain a second reference operation point $RP_{O2}$ at the phase-distance plane as shown in FIG. 9, wherein the second distance obtained according to the second reference operation point $RP_{O2}$ is substantially identical to the second distance obtained according to the second reference point $RP_{r2}$. The method of obtaining the first operation phase and the second operation phase is similarly to that of obtaining the first reference phase and the second reference phase, and thus details thereof are not repeated herein.

Next, the processor 49 obtains the operation phase-distance relationship $L_{Ro}$ according to a line connecting the first reference operation point $RP_{O1}$ and the second reference operation point $RP_{O2}$. The operation phase-distance relationship $L_{Ro}$ is then recorded in the memory.

Please referring to FIGS. 3 to 5, FIG. 7A, FIG. 8 and FIG. 10, the temperature compensation in actual operation is illustrated hereinafter. The environmental temperature during actual operation is also under the operating temperature.

When the sampling signal $S_{d1}$ and the light source driving signal $S_{d2\_nd}$ and $S_{d2\_d}$ have the first time delay $T_{d0}$, the second pixel 332 generates an operation detected signal, similar to $S_{O2\_nd}$ as shown in FIG. 7A. Similarly, when the operating temperature is different from the reference temperature and the object distance is different from the predetermined distance D, an ratio of area of the pulses in operation detected signal is different from the ratio of area B3/(A3+B3) as shown in FIG. 7A.

Figure 10:
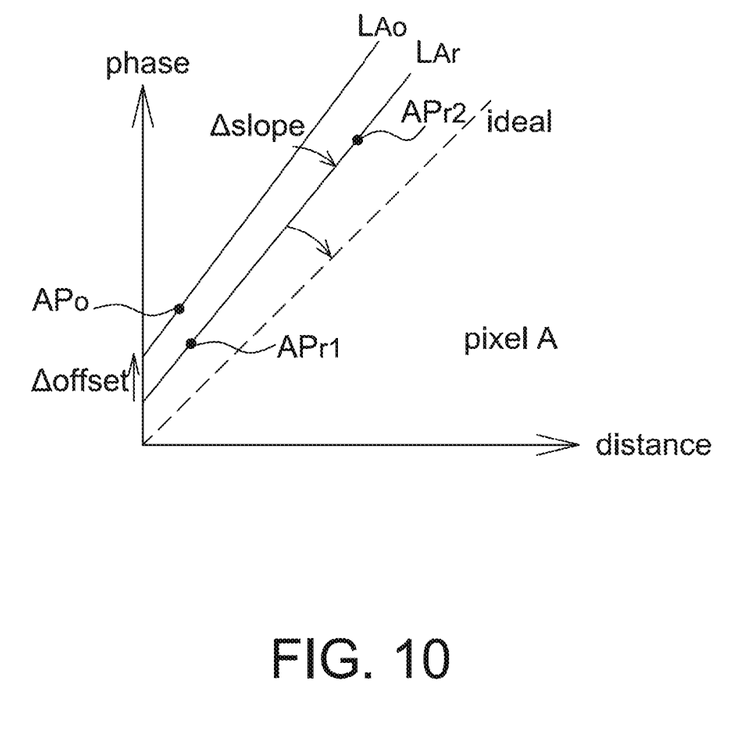
FIG. 10 is a relationship diagram between detected phases and detected distances associated with a second pixel when a TOF sensor of the present disclosure is at a reference temperature and an operating temperature.

Using the same method mentioned above, the processor 49 calculates a current phase (e.g., a longitudinal axis value of current operation point $AP_O$) according to an ratio of area of the operation detected signal, and calculates a current distance (e.g., a traverse axis value of current operation point $AP_O$) according to $T_{overall}=T_{tof}$ so as to obtain a current operation point $AP_O$. In this stage, the object distance is a value to be measured. As shown in FIG. 10, a longitudinal distance between the current operation point $AP_O$ and the second reference phase-distance relationship $L_{Ar}$ is caused by temperature variation. Therefore, the processor 49 calibrates the current phase of the current operation point $AP_O$ obtained according to the operation detected signal using the recorded temperature compensation Δoffset and the temperature correction Δslope. For example, the current phase is calibrated onto the line $L_{Ar}$ using an equation: (current phase−Δoffset)/Δslope, which indicates a phase calibrated back to the reference temperature. Finally, the processor 49 further calibrates the current distance of the current operation point $AP_O$ obtained according to the operation detected signal using the recorded detection compensation and detection correction, e.g., using an equation:

Compensated distance=velocity of light×detection correction×[(current phase−Δoffset)/Δslope−detection compensation]/2

That is, the processor 49 calibrates the current distance according to the recorded temperature compensation, temperature correction, detection compensation and detection correction, wherein the current distance is calculated according to a time of flight currently detected. In other words, if the object is arranged just at the predetermined distance (i.e. the distance D for obtaining $L_{Rr}$ and $L_{Ar}$ before shipment), an operation line $L_{Ao}$ shown in FIG. 10 is obtainable. In this case, by using the temperature compensation Δoffset and the temperature correction Δslope (obtained according to FIG. 9), the operation line $L_{Ao}$ is calibrated to match the reference line $L_{Ar}$ to eliminate the deviation caused by temperature variation. Then, by using the detection compensation and the detection correction (obtained according to FIG. 8), the reference line $L_{Ar}$ is calibrated to match the ideal line.

In another aspect, the processor 49 calculates a current phase and a current distance according to the operation detected signal generated by the second pixel 332 when the sampling signal $S_{d1}$ and the light source driving signal $S_{d2\_nd}$ and $S_{d2\_d}$) have the second time delay $T_{delay}$. That is, in the present disclosure the time delay used for calculating the current phase and the current distance is not particularly limited.

Figure 11:
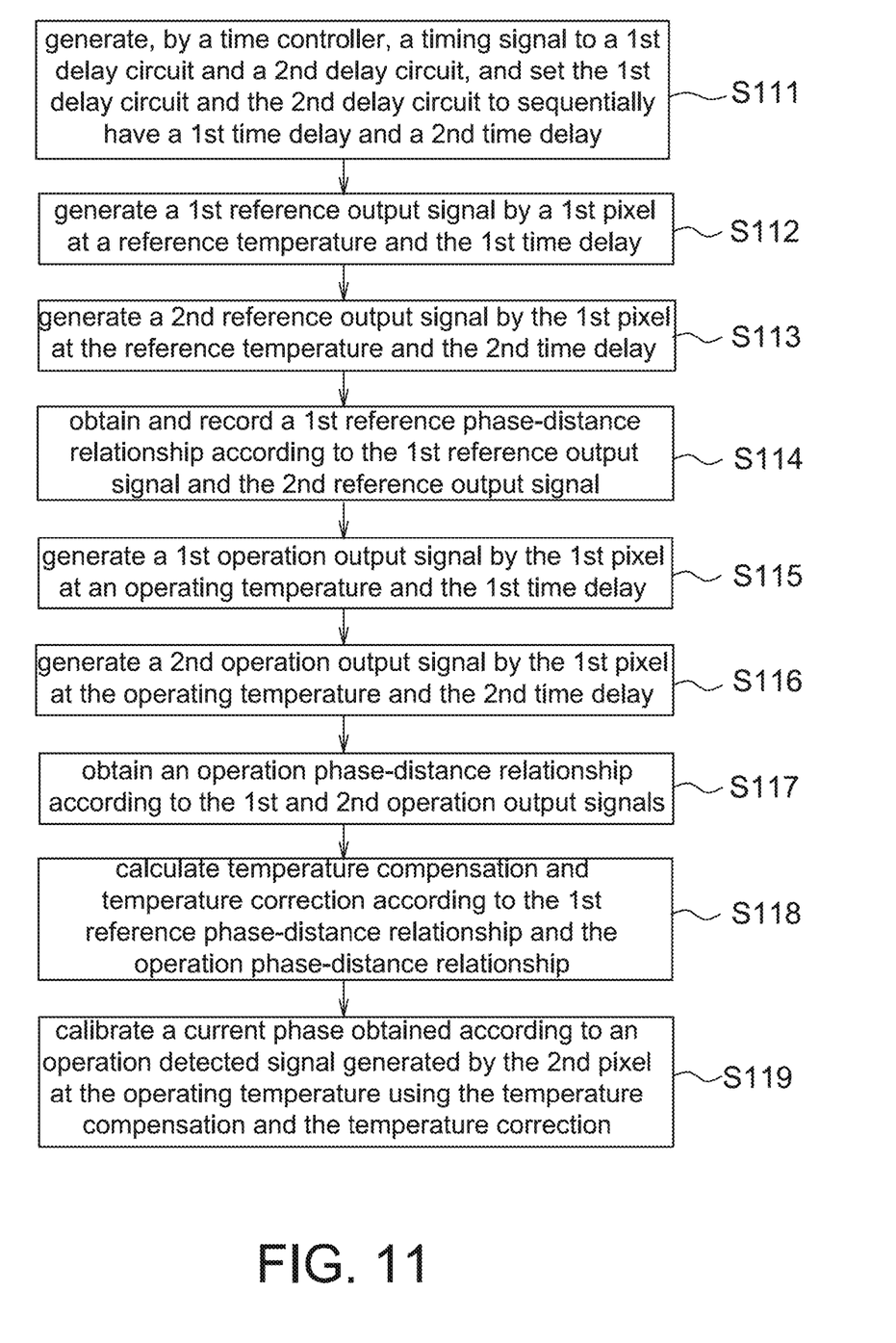
FIG. 11 is a flow chart of a temperature compensation method of a TOF sensor according to one embodiment of the present disclosure.

Referring to FIG. 11, it is a flow chart of a temperature compensation method of the TOF sensor 300 according to one embodiment of the present disclosure, and the method includes the steps of: generating, by a time controller 41, a timing signal $S_{syn}$ to a first delay circuit 431 and a second delay circuit 433, and setting the first delay circuit 431 and the second delay circuit 433 to sequentially have a first time delay $T_{d0}$ and a second time delay $T_{delay}$ (Step S111); generating a first reference output signal $S_{O1\_nd}$ by a first pixel 331 at a reference temperature and the first time delay $T_{d0}$ (Step S112); generating a second reference output signal $S_{O1\_d}$ by the first pixel 331 at the reference temperature and the second time delay $T_{delay}$ (Step S113); obtaining and recording a first reference phase-distance relationship $L_{Rr}$ according to the first reference output signal $S_{O1\_nd}$ and the second reference output signal $S_{O1\_d}$ (Step S114); generating a first operation output signal by the first pixel 331 at an operating temperature and the first time delay $T_{d0}$ (Step S115); generating a second operation output signal by the first pixel 331 at the operating temperature and the second time delay $T_{delay}$ (Step S116); obtaining an operation phase-distance relationship $L_{Ro}$ according to the first operation output signal and the second operation output signal (Step S117); calculating a temperature compensation Δoffset and a temperature correction Δslope according to the first reference phase-distance relationship $L_{Rr}$ and the operation phase-distance relationship $L_{Ro}$ (Step S118); and calibrating a current phase obtained according to an operation detected signal generated by the second pixel 332 at the operating temperature using the temperature compensation Δoffset and the temperature correction Δslope.

Details of these steps of the temperature compensation method have been illustrated above, wherein the Steps S112-S114 are executed, for example, in a setting stage before shipment; the Steps S115-S118 are executed, for example, in a booting stage before accrual operation; the Step S111 is executed in both the setting stage and the booting stage; and the Step S119 is executed according to a current phase measured according to a current time of flight in actual operation.

In addition, the above steps are mainly used to eliminate the phase deviation caused by temperature variation. If it is desired to eliminate the distance deviation caused by other factors, the temperature compensation method of the present disclosure preferably further includes the steps of: generating a first detection output signal $S_{O2\_nd}$ by the second pixel 332 at the reference temperature and the first time delay $T_{d0}$; generating a second detection output signal $S_{O2\_d}$ by the second pixel 332 at the reference temperature and the second time delay $T_{delay}$; obtaining a second reference phase-distance relationship $L_{Ar}$ according to the first detection output signal $S_{O2\_nd}$ and the second detection output signal $S_{O2\_d}$; calculating and recording a detection compensation and a detection correction according to the second reference phase-distance relationship $L_{Ar}$; and calibrating a current distance obtained according an operation detected signal using the detection compensation and the detection correction. Details of these steps are also described above, and thus are not repeated herein.

In the present disclosure, it is assumed that the operating temperature does not have apparent change within a short time, and thus the operation phase-distance relationship $L_{Ro}$ is described in the way being obtained in the booting stage. However, if the operating temperature can change significantly within a short time, the operation phase-distance relationship $L_{Ro}$ is calculated and recorded anytime according to the requirement of the user as long as being recorded before the actual operation.

As mentioned above, the object distance detected by the conventional TOF sensor is deviated due to the environmental temperature change, and the conventional method for compensating this deviation is not effective to the TOF sensor with modulated light source. Therefore, the present disclosure further provides a time of flight sensor for compensating the temperature deviation (as shown in FIGS. 3-4) and a temperature compensation method thereof (as shown in FIG. 11) that record the temperature compensation and the temperature correction in the memory before the actual operation so as to eliminate the phase deviation and distance error caused by the environmental temperature change.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A time-of-flight (TOF) sensor, comprising:
a light source, configured to illuminate light according to a light source driving signal;
a light sensor, comprising:
a first pixel, configured to receive a sampling signal,
generate, at a reference temperature, a first reference output signal when the sampling signal and the light source driving signal have a first time delay therebetween, and generate a second reference output signal when the sampling signal and the light source driving signal have a second time delay therebetween, and
generate, at an operating temperature, a first operation output signal when the sampling signal and the light source driving signal have the first time delay therebetween, and generate a second operation output signal when the sampling signal and the light source driving signal have the second time delay therebetween; and
a second pixel, configured to receive the sampling signal, and generate an operation detected signal at the operating temperature when the sampling signal and the light source driving signal have the first time delay therebetween; and a processor, configured to
obtain a first reference phase-distance relationship according to the first reference output signal and the second reference output signal, and obtain an operation phase-distance relationship according to the first operation output signal and the second operation output signal,
calculate a temperature compensation and a temperature correction according to the first reference phase-distance relationship and the operation phase-distance relationship, and
calibrate a current phase obtained according to the operation detected signal using the temperature compensation and the temperature correction.

2. The TOF sensor as claimed in claim 1, wherein the first time delay is zero and the second time delay is larger than zero.

3. The TOF sensor as claimed in claim 1, further comprising a time control circuit configured to control a time delay between the sampling signal and the light source driving signal.

4. The TOF sensor as claimed in claim 1, further comprising:
an encapsulation, comprising:
a first accommodation space accommodating the first pixel and the light source, wherein the first pixel is configured to receive reflected light from a top cover of the encapsulation illuminated by the light source;
a second accommodation space accommodating the second pixel; and
an isolation wall separating the first accommodation space and the second accommodation space to cause the second pixel not to directly receive emission light from the light source.

5. The TOF sensor as claimed in claim 1, wherein
the second pixel is further configured to generate, at the reference temperature, a first detection output signal when the sampling signal and the light source driving signal have the first time delay therebetween, and generate a second detection output signal when the sampling signal and the light source driving signal have the second time delay therebetween, and
the processor is further configured to obtain a second reference phase-distance relationship according to the first detection output signal and the second detection output signal, and calculate and record a detection compensation and a detection correction according to the second reference phase-distance relationship.

6. The TOF sensor as claimed in claim 5, wherein the processor is further configured to calibrate a current distance obtained according to the operation detected signal using the detection compensation and the detection correction.

7. The TOF sensor as claimed in claim 5, wherein the first reference phase-distance relationship and the second reference phase-distance relationship are previously recorded in a memory.

8. The TOF sensor as claimed in claim 1, wherein the processor is further configured to
obtain a first reference phase according to the first reference output signal and obtain a first distance according to the first time delay,
obtain a second reference phase according to the second reference output signal and obtain a second distance according to the second time delay, and
obtain the first reference phase-distance relationship at a phase-distance plane using the first reference phase, the first distance, the second reference phase and the second distance.

9. A time-of-flight (TOF) sensor, comprising:
a light source, configured to illuminate light according to a light source driving signal;
a light sensor, comprising a first pixel and a second pixel configured to generate output signals according to a sampling signal;
a memory, configured to previously record
a first reference phase-distance relationship associated with the first pixel at a reference temperature, and
a detection compensation and a detection correction that are obtained according to a second reference phase-distance relationship associated with the second pixel at the reference temperature; and
a processor configured to, at an operating temperature,
calculate an operation phase-distance relationship associated with the first pixel,
calculate a temperature compensation and a temperature correction according to the first reference phase-distance relationship and the operation phase-distance relationship, and
calibrate a current distance using the temperature compensation, the temperature correction, the detection compensation and the detection correction.

10. The TOF sensor as claimed in claim 9, further comprising:
an encapsulation, comprising:
a first accommodation space accommodating the first pixel and the light source, wherein the first pixel is configured to receive reflected light from a top cover of the encapsulation illuminated by the light source;
a second accommodation space accommodating the second pixel; and
an isolation wall separating the first accommodation space and the second accommodation space to cause the second pixel not to directly receive emission light from the light source.

11. The TOF sensor as claimed in claim 9, wherein the first reference phase-distance relationship is obtained at the reference temperature according to
a first reference output signal generated by the first pixel when the sampling signal and the light source driving signal has a first time delay therebetween, and
a second reference output signal generated by the first pixel when the sampling signal and the light source driving signal has a second time delay therebetween.

12. The TOF sensor as claimed in claim 9, wherein the operation phase-distance relationship is obtained at the operating temperature according to
a first operation output signal generated by the first pixel when the sampling signal and the light source driving signal has a first time delay therebetween, and
a second operation output signal generated by the first pixel when the sampling signal and the light source driving signal has a second time delay therebetween.

13. The TOF sensor as claimed in claim 9, wherein the second reference phase-distance relationship is obtained at the reference temperature according to
a first detection output signal generated by the second pixel when the sampling signal and the light source driving signal has a first time delay therebetween, and a second detection output signal generated by the second pixel when the sampling signal and the light source driving signal has a second time delay therebetween.

14. The TOF sensor as claimed in claim 9, wherein the current phase is obtained according to an operation detected signal of the second pixel at the operating temperature.

15. A temperature compensation method of a time of flight (TOF) sensor, the TOF sensor comprising a time controller, a first delay circuit, a second delay circuit, a first pixel, a second pixel and a light source, the first delay circuit being coupled to the light source, and the second delay circuit being coupled to the first pixel and the second pixel, the temperature compensation method comprising:

generating, by the time controller, a timing signal to the first delay circuit and the second delay circuit, and setting the first delay circuit and the second delay circuit to sequentially have a first time delay and a second time delay;

generating a first reference output signal by the first pixel at a reference temperature and the first time delay;

generating a second reference output signal by the first pixel at the reference temperature and the second time delay;

obtaining and recording a first reference phase-distance relationship according to the first reference output signal and the second reference output signal;

generating a first operation output signal by the first pixel at an operating temperature and the first time delay;

generating a second operation output signal by the first pixel at the operating temperature and the second time delay;

obtaining an operation phase-distance relationship according to the first operation output signal and the second operation output signal;

calculating a temperature compensation and a temperature correction according to the first reference phase-distance relationship and the operation phase-distance relationship; and calibrating a current phase obtained according to an operation detected signal generated by the second pixel at the operating temperature using the temperature compensation and the temperature correction.

16. The temperature compensation method as claimed in claim 15, wherein the first time delay is zero and the second time delay is larger than zero.

17. The temperature compensation method as claimed in claim 15, further comprising:

generating a first detection output signal by the second pixel at the reference temperature and the first time delay;

generating a second detection output signal by the second pixel at the reference temperature and the second time delay;

obtaining a second reference phase-distance relationship according to the first detection output signal and the second detection output signal;

calculating and recording a detection compensation and a detection correction according to the second reference phase-distance relationship; and calibrating a current distance obtained according the operation detected signal using the detection compensation and the detection correction.

18. The temperature compensation method as claimed in claim 17, further comprising:

obtaining a first detected phase according to the first detection output signal, and obtaining a first detected distance according to the first time delay and a predetermined time of flight so as to obtain a first detected point at a phase-distance plane;

obtaining a second detected phase according to the second detection output signal, and obtaining a second detected distance according to the second time delay and the predetermined time of flight so as to obtain a second detected point at the phase-distance plane; and obtaining the second reference phase-distance relationship at the phase-distance plane according to the first detected point and the second detected point.

19. The temperature compensation method as claimed in claim 15, further comprising:

obtaining a first reference phase according to the first reference output signal, and obtaining a first distance according to the first time delay so as to obtain a first reference point at a phase-distance plane;

obtaining a second reference phase according to the second reference output signal, and obtaining a second distance according to the second time delay so as to obtain a second reference point at the phase-distance plane; and obtaining the first reference phase-distance relationship at the phase-distance plane according to the first reference point and the second reference point.

20. The temperature compensation method as claimed in claim 15, further comprising:

obtaining a first operation phase according to the first operation output signal, and obtaining a first distance according to the first time delay so as to obtain a first reference operation point at a phase-distance plane;

obtaining a second operation phase according to the second operation output signal, and obtaining a second distance according to the second time delay so as to obtain a second reference operation point at the phase-distance plane; and obtaining the operation phase-distance relationship at the phase-distance plane according to the first reference operation point and the second reference operation point.

* * * * *